United States Patent
Pani (10) Patent No.: US 9,698,994 B2
(45) Date of Patent: Jul. 4, 2017

(54) LOOP DETECTION AND REPAIR IN A MULTICAST TREE

(71) Applicant: Cisco Technology, Inc., San Jose, CA (US)

(72) Inventor: Ayaskant Pani, Fremont, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 203 days.

(21) Appl. No.: 14/329,729

(22) Filed: Jul. 11, 2014

(65) Prior Publication Data

US 2015/0124587 A1    May 7, 2015

Related U.S. Application Data

(60) Provisional application No. 61/900,359, filed on Nov. 5, 2013.

(51) Int. Cl.
*H04L 12/18* (2006.01)
*H04L 12/761* (2013.01)
(Continued)

(52) U.S. Cl.
CPC .......... *H04L 12/18* (2013.01); *H04L 12/4633* (2013.01); *H04L 41/082* (2013.01); *H04L 41/12* (2013.01); *H04L 41/22* (2013.01); *H04L 43/0811* (2013.01); *H04L 43/50* (2013.01); *H04L 45/02* (2013.01); *H04L 45/12* (2013.01); *H04L 45/16* (2013.01); *H04L 45/18* (2013.01);
(Continued)

(58) Field of Classification Search
CPC ... H04L 12/66; H04L 12/185; H04L 43/0847; H04L 69/324; H04L 12/18; H04L 45/16; H04L 45/48; H04L 45/12; H04L 45/28; H04L 45/18; H04L 43/50; H04L 45/20; H04L 43/0811; H04L 41/12; H04L 45/02; H04L 49/25; H04L 49/201; H04L 41/08

See application file for complete search history.

(56) References Cited

U.S. PATENT DOCUMENTS 6,456,624 B1    9/2002    Eccles et al.
7,152,117 B1    12/2006    Stapp et al.
(Continued)

FOREIGN PATENT DOCUMENTS

WO    WO 2014071996    5/2014

OTHER PUBLICATIONS

Andrew Whitaker and David Wetherall, Forwarding Without Loops in Icarus, Aug. 2002, IEEE, pp. 63-75.*

*Primary Examiner* — Benjamin H Elliott, IV
*Assistant Examiner* — Prince A Mensah
(74) *Attorney, Agent, or Firm* — Polsinelli PC (57) ABSTRACT

Systems, methods and transitory computer-readable storage media for detecting one or more loops in a multicast tree. The method includes calculating a multicast tree radius for a first multicast tree, the multicast tree radius representing a maximum number of hops from a root node to a furthest edge node in the first multicast tree, forwarding, by the root node, a first packet to each edge node within the first multicast tree, the first packet having a time-to-live (TTL) value equal to twice the first multicast tree radius, receiving, at the root node, a copy of the forwarded first packet, and determining an existence of a loop in the first multicast tree based at least upon receiving the copy of the forwarded first packet.

14 Claims, 5 Drawing Sheets

(51) Int. Cl.

| | | |
|---|---|---|
| *H04L 12/753* | (2013.01) | |
| *H04L 12/721* | (2013.01) | |
| *H04L 12/703* | (2013.01) | |
| *H04L 12/705* | (2013.01) | |
| *H04L 12/26* | (2006.01) | |
| *H04L 12/733* | (2013.01) | |
| *H04L 12/24* | (2006.01) | |
| *H04L 12/751* | (2013.01) | |
| *H04L 12/947* | (2013.01) | |
| *H04L 12/931* | (2013.01) | |
| *H04L 12/715* | (2013.01) | |
| *H04L 29/12* | (2006.01) | |
| *H04L 29/06* | (2006.01) | |
| *H04L 12/46* | (2006.01) | |

(52) U.S. Cl.
CPC ............ *H04L 45/20* (2013.01); *H04L 45/28* (2013.01); *H04L 45/48* (2013.01); *H04L 45/64* (2013.01); *H04L 49/201* (2013.01); *H04L 49/25* (2013.01); *H04L 61/2007* (2013.01); *H04L 61/2061* (2013.01); *H04L 61/6004* (2013.01); *H04L 69/22* (2013.01); *H04L 61/103* (2013.01)

(56) References Cited

U.S. PATENT DOCUMENTS

| | | |
|---|---|---|
| 7,177,946 B1 | 2/2007 | Kaluve et al. |
| 7,826,400 B2 | 11/2010 | Sakauchi |
| 7,848,340 B2 | 12/2010 | Sakauchi et al. |
| 8,339,973 B1 | 12/2012 | Pichumani et al. |
| 8,868,766 B1 | 10/2014 | Theimer et al. |
| 9,258,195 B1 | 2/2016 | Pendleton et al. |
| 9,374,294 B1 | 6/2016 | Pani |
| 9,444,634 B2 | 9/2016 | Pani et al. |
| 2003/0067912 A1 | 4/2003 | Mead et al. |
| 2003/0115319 A1 | 6/2003 | Dawson et al. |
| 2004/0103310 A1 | 5/2004 | Sobel et al. |
| 2004/0160956 A1 | 8/2004 | Hardy et al. |
| 2004/0249960 A1 | 12/2004 | Hardy et al. |
| 2005/0010685 A1* | 1/2005 | Ramnath ............... H04L 69/324 709/238 |
| 2005/0013280 A1 | 1/2005 | Buddhikot et al. |
| 2005/0083835 A1 | 4/2005 | Prairie et al. |
| 2005/0117593 A1 | 6/2005 | Shand |
| 2005/0175020 A1 | 8/2005 | Park et al. |
| 2005/0207410 A1 | 9/2005 | Adhikari |
| 2006/0013143 A1* | 1/2006 | Yasuie ................... H04L 12/66 370/249 |
| 2006/0039364 A1 | 2/2006 | Wright |
| 2006/0072461 A1 | 4/2006 | Luong et al. |
| 2006/0193332 A1 | 8/2006 | Qian et al. |
| 2006/0209688 A1 | 9/2006 | Tsuge et al. |
| 2006/0221950 A1 | 10/2006 | Heer |
| 2006/0227790 A1 | 10/2006 | Yeung et al. |
| 2006/0268742 A1* | 11/2006 | Chu ....................... H04L 41/12 370/254 |
| 2006/0274647 A1 | 12/2006 | Wang et al. |
| 2006/0280179 A1 | 12/2006 | Meier |
| 2007/0025241 A1 | 2/2007 | Nadeau et al. |
| 2007/0047463 A1 | 3/2007 | Jarvis et al. |
| 2007/0165515 A1 | 7/2007 | Vasseur |
| 2007/0171814 A1 | 7/2007 | Florit et al. |
| 2007/0177525 A1 | 8/2007 | Wijnands et al. |
| 2007/0183337 A1 | 8/2007 | Cashman et al. |
| 2007/0217415 A1 | 9/2007 | Wijnands et al. |
| 2008/0031130 A1 | 2/2008 | Raj et al. |
| 2008/0092213 A1 | 4/2008 | Wei et al. |
| 2008/0212496 A1 | 9/2008 | Zou |
| 2009/0067322 A1 | 3/2009 | Shand et al. |
| 2009/0094357 A1 | 4/2009 | Keohane et al. |
| 2009/0161567 A1* | 6/2009 | Jayawardena ...... H04L 43/0847 370/252 |
| 2009/0193103 A1 | 7/2009 | Small et al. |
| 2009/0232011 A1 | 9/2009 | Li et al. |
| 2009/0238196 A1 | 9/2009 | Ukita et al. |
| 2010/0020719 A1 | 1/2010 | Chu et al. |
| 2010/0020726 A1 | 1/2010 | Chu et al. |
| 2010/0191813 A1 | 7/2010 | Gandhewar et al. |
| 2010/0191839 A1 | 7/2010 | Gandhewar et al. |
| 2010/0223655 A1 | 9/2010 | Zheng |
| 2010/0312875 A1 | 12/2010 | Wilerson et al. |
| 2011/0022725 A1 | 1/2011 | Farkas |
| 2011/0110241 A1 | 5/2011 | Atkinson et al. |
| 2011/0138310 A1 | 6/2011 | Gomez et al. |
| 2011/0170426 A1 | 7/2011 | Kompella et al. |
| 2011/0199891 A1 | 8/2011 | Chen |
| 2011/0199941 A1 | 8/2011 | Ouellette et al. |
| 2011/0243136 A1 | 10/2011 | Raman et al. |
| 2011/0280572 A1 | 11/2011 | Vobbilisetty et al. |
| 2011/0286447 A1 | 11/2011 | Liu et al. |
| 2011/0299406 A1 | 12/2011 | Vobbilisetty et al. |
| 2011/0321031 A1 | 12/2011 | Dournov et al. |
| 2012/0030150 A1 | 2/2012 | McAuley et al. |
| 2012/0057505 A1 | 3/2012 | Xue |
| 2012/0102114 A1 | 4/2012 | Dunn et al. |
| 2012/0300669 A1 | 11/2012 | Zahavi |
| 2013/0055155 A1 | 2/2013 | Wong et al. |
| 2013/0097335 A1 | 4/2013 | Jiang et al. |
| 2013/0182712 A1 | 7/2013 | Aguayo et al. |
| 2013/0208624 A1 | 8/2013 | Ashwood-Smith |
| 2013/0223276 A1 | 8/2013 | Padgett |
| 2013/0227689 A1 | 8/2013 | Pietrowicz et al. |
| 2013/0250779 A1 | 9/2013 | Meloche et al. |
| 2013/0250951 A1 | 9/2013 | Koganti |
| 2013/0276129 A1 | 10/2013 | Nelson et al. |
| 2013/0311663 A1 | 11/2013 | Kamath et al. |
| 2013/0311991 A1 | 11/2013 | Li et al. |
| 2013/0322258 A1 | 12/2013 | Nedeltchev et al. |
| 2013/0322446 A1 | 12/2013 | Biswas et al. |
| 2013/0329605 A1 | 12/2013 | Nakil et al. |
| 2013/0332399 A1 | 12/2013 | Reddy et al. |
| 2013/0332577 A1 | 12/2013 | Nakil et al. |
| 2013/0332602 A1 | 12/2013 | Nakil et al. |
| 2014/0016501 A1 | 1/2014 | Kamath et al. |
| 2014/0086097 A1 | 3/2014 | Qu et al. |
| 2014/0146817 A1 | 5/2014 | Zhang |
| 2014/0149819 A1 | 5/2014 | Lu et al. |
| 2014/0201375 A1 | 7/2014 | Beereddy et al. |
| 2014/0219275 A1 | 8/2014 | Allan et al. |
| 2014/0269712 A1 | 9/2014 | Kidambi |
| 2015/0016277 A1 | 1/2015 | Smith et al. |
| 2015/0092593 A1 | 4/2015 | Kompella |
| 2015/0113143 A1 | 4/2015 | Stuart et al. |
| 2015/0124586 A1 | 5/2015 | Pani |
| 2015/0124629 A1 | 5/2015 | Pani |
| 2015/0124642 A1 | 5/2015 | Pani |
| 2015/0124644 A1 | 5/2015 | Pani |
| 2015/0124654 A1 | 5/2015 | Pani |
| 2015/0124823 A1 | 5/2015 | Pani et al. |
| 2015/0127701 A1 | 5/2015 | Chu et al. |
| 2015/0188771 A1* | 7/2015 | Allan .................... H04L 12/185 370/217 |
| 2015/0378712 A1 | 12/2015 | Cameron et al. |
| 2015/0378969 A1 | 12/2015 | Powell et al. |
| 2016/0119204 A1 | 4/2016 | Murasato et al. |

\* cited by examiner

LOOP DETECTION AND REPAIR IN A MULTICAST TREE

CROSS-REFERENCE TO RELATED APPLICATIONS

This application claims priority to U.S. Provisional Patent Application No. 61/900,359, filed on Nov. 5, 2013, which is expressly incorporated by reference herein in its entirety.

TECHNICAL FIELD

The present technology pertains to data networks, and more specifically pertains to automatically detecting loops within a multicast tree in order to repair the loop, thus ensuring loop free multicast data delivery during instances of network convergence.

BACKGROUND

In a proposed multicast implementation for Virtual Extensible Local Area Network ("VXLAN") networks, multiple Forwarding Tag (FTAG) multicast trees are constructed from the dense bipartite graph of fabric nodes/edges and each such multicast tree (henceforth called "FTAG" tree) is used to forward tenant multicast packets which are encapsulated in VXLAN and are distributed to various fabric edge switches (ToRs). Multiple trees are created for load balancing purposes. An external controller decides a suitable root node for each FTAG instance and distributes this information to all the member switches of a fabric. The FTAG trees are created in a distributed manner where each node independently decides (through an algorithm) which local links should be included in a given instance of FTAG tree. During periods of network convergence (which might be due to link failure or FTAG root failure) there is a possibility that nodes have a disparate view of the network thus indicating that there is a possibility of a loop created in the FTAG tree construction. Loops can be problematic from a multicast tree point of view because there can be duplicate packets delivered to the tenant end nodes if loops are created in the tree. Since forwarding latency is very low even when loops persist only for a transient period of times, this can result in a large number of duplicate packets sent to the tenant end hosts.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

The disclosed technology addresses the need in the art for automatically detecting one or more loops within a multicast tree and repairing the loops thus ensuring loop free multicast data delivery.

Overview

In one aspect of the disclosure, a method for detecting the presence of a loop in a multicast tree is provided. The method includes calculating a multicast tree radius for a first multicast tree. The multicast tree radius represents a maximum number of hops from a root node to a furthest edge node in the first multicast tree. The method further includes forwarding, by the root node, a first packet to each edge node within the first multicast tree, the first packet having a time-to-live (TTL) value equal to twice the first multicast tree radius, receiving, at the root node, a copy of the forwarded first packet, and determining an existence of a loop in the first multicast tree based at least upon receiving the copy of the forwarded first packet.

In another aspect of the disclosure, a system for detecting the presence of a loop in a multicast tree is provided. The system includes at least one edge node and a root node in communication with the at least one edge node, the root node and the at least one edge node forming a first multicast tree. The root node is configured to calculate a multicast tree radius for the first multicast tree, the multicast tree radius representing a maximum number of hops from the root node to a furthest edge node in the first multicast tree, forward a first packet to each edge node within the first multicast tree, the first packet having a time-to-live (TTL) value equal to twice the first multicast tree radius, receive a copy of the forwarded first packet, and determine an existence of a loop in the first multicast tree based at least upon receiving the copy of the forwarded first packet.

Yet another aspect of the disclosure provides a non-transitory computer-readable storage medium having stored therein instructions which, when executed by a processor, cause the processor to perform a series of operations. These operations include calculating a multicast tree radius for a first multicast tree, where the multicast tree radius represents a maximum number of hops from a root node to a furthest edge node in the first multicast tree, forwarding a first packet to each edge node within the first multicast tree, the first packet having a time-to-live (TTL) value equal to twice the first multicast tree radius, receiving a copy of the forwarded first packet, and determining an existence of a loop in the first multicast tree based at least upon receiving the copy of the forwarded first packet.

DETAILED DESCRIPTION

The present disclosure describes systems, methods, and non-transitory computer-readable storage media for detecting and repairing loops in multicast trees. In one implementation, the present disclosure provides a VXLAN or alternate overlay solution in a multicast tree built in an infra network, where the multicast tree transmits tenant traffic among hosts via switches or nodes. In a multicast implementation, multiple forwarding tag (FTAG) multicast trees are constructed from the dense bipartite graph of fabric nodes and switches. Each multicast tree (also referred to as "FTAG tree") is used to forward a tenant multicast data packet, which is encapsulated inside a VXLAN packet, and this VXLAN packet forwarded for distribution to various fabric edge nodes or switches (also referred to as ToRs). The end nodes or switches decapsulate the VXLAN packet and forward the tenant multicast traffic to tenant recipient hosts. Multiple trees can exist in the network. The multiple trees are created for load balancing purposes. An external controller decides a suitable root node for each FTAG instance and distributes the information to all member switches of a given fabric. The FTAG trees are created in a distributed manner where each node independently decides, via an algorithm, which local links should be included in a given instance of an FTAG tree.

During periods of network convergence, which may be due to a link failure or FTAG root node failure, there is a possibility that the nodes have disparate views of the network. This typically indicates the existence of a loop created in the FTAG tree construction. Any tenant multicast traffic forwarding using an FTAG tree with a loop will result in multiple duplicate packets being delivered to end nodes, which is highly undesirable. The present disclosure applies to all types of multicast environments. One type of multicast environment is where tenant multicast traffic is encapsulated within a "VXLAN outer packet. The outer packet's destination Internet Protocol ("IP") address is a multicast address derived from the inner packet's multicast address and maps to an infra-Virtual Routing and Forwarding ("VRF") multicast address. The outer packet is distributed over the infra-VRF to the various ToR switches where the inner multicast group's interested receivers are present and the egress ToRs decapsulate and forward the packet to the interested receivers.

The distribution tree is based on an FTAG tree constructed in the overlay/infra space. Each tree has an FTAG root and the tree can be bi-directional. As a multicast source sends a packet, the ingress ToR connected to this source encapsulates the inner tenant multicast packet in a VXLAN packet and forwards the packet over all the branches on the chosen FTAG tree. The packet will travel towards the root of the FTAG tree and then be redistributed to other branches of the tree until it reaches the intended edge switch/ToR. The leaf ToRs decapsulate and forward the packet to receivers that they are in communication with.

During times of network failure, the tree may experience one or more loops. In these instances, the packet forwarded over the tree that has intermediate loops will create a duplicate packet for delivery to the end hosts.

Figure 1:
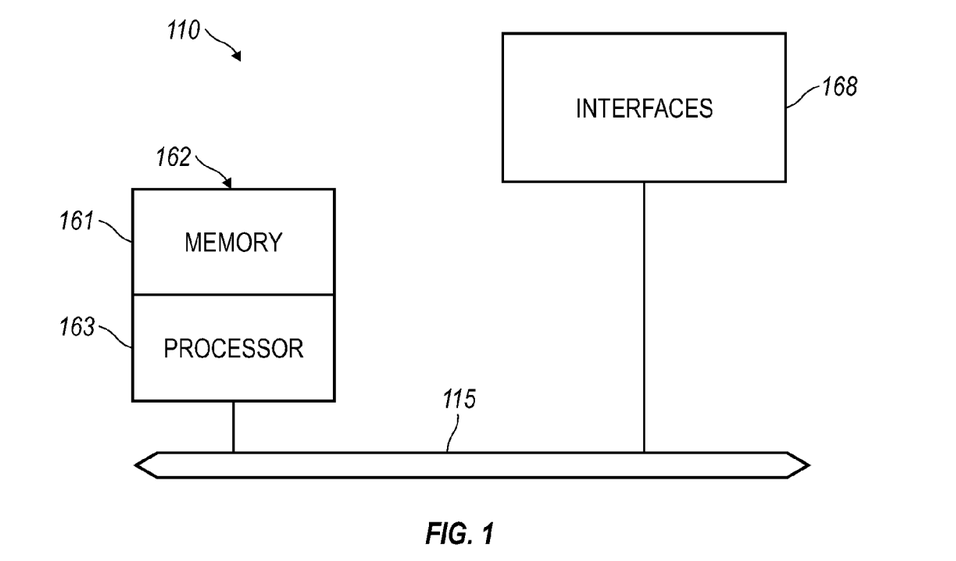
FIG. 1 illustrates an example network device in which embodiments of the present disclosure may be implemented.

FIG. 1 illustrates an example network device 110 suitable for implementing the present invention. Network device 110 includes a master central processing unit (CPU) 162, interfaces 168, and a bus 115 (e.g., a Peripheral Component Interconnect ("PCI") bus. When acting under the control of appropriate software or firmware, the CPU 162 is responsible for executing packet management, error detection, and/or routing functions, such as miscabling detection functions, for example. CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the router 110. Among the interfaces that may be provided are Ethernet interfaces, frame relay interfaces, cable interfaces, Digital Subscriber Line ("DSL") interfaces, token ring interfaces, and the like. In addition, various very high-speed interfaces may be provided such as fast token ring interfaces, wireless interfaces, Ethernet interfaces, Gigabit Ethernet interfaces, Asynchronous Transfer Mode (ATM" interfaces, High Speed Serial Interfaces (HSSI), Packet-Over-SONET (POS) interfaces, Fiber Distributed Data Interfaces (FDDI) and the like. Generally, these interfaces may include ports appropriate for communication with the appropriate media. In some cases, they may also include an independent processor and, in some instances, volatile random access memory (RAM). The independent processors may control such communications intensive tasks as packet switching, media control and management. By providing separate processors for the communications intensive tasks, these interfaces allow the master microprocessor 162 to efficiently perform routing computations, network diagnostics, security functions, etc.

Although the system shown in FIG. 1 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2:
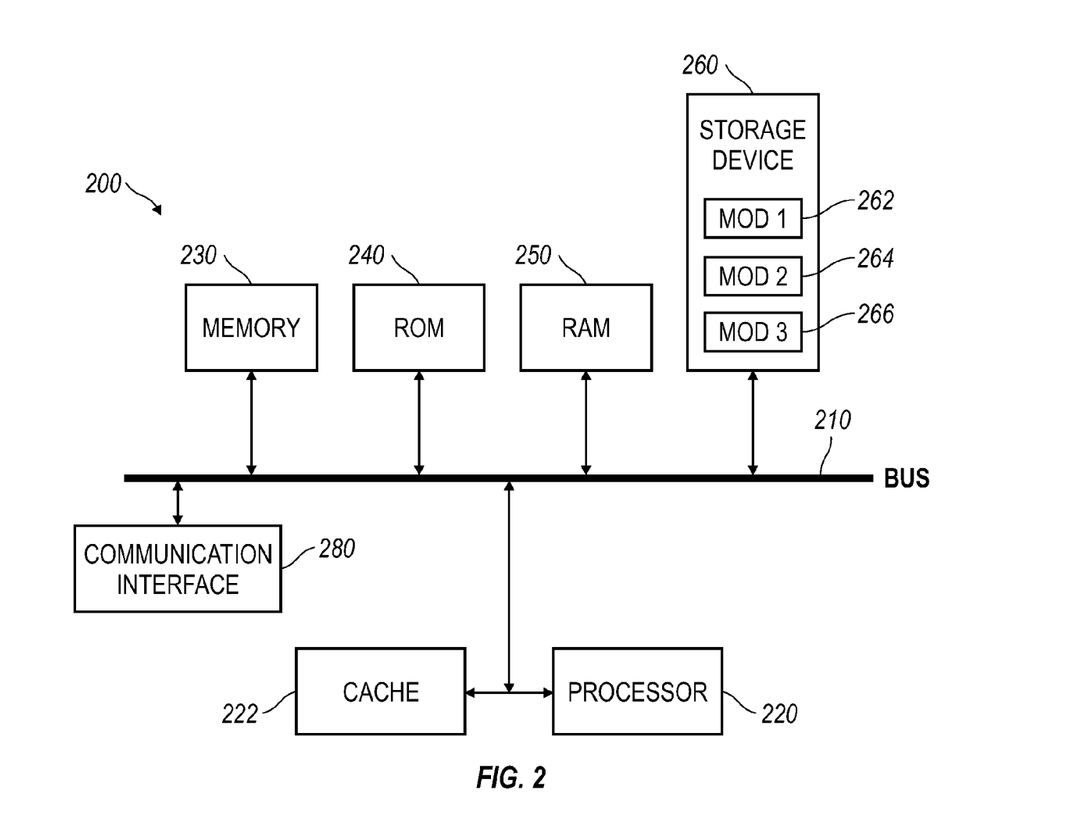
FIG. 2 illustrates an example system embodiment.

FIG. 2 illustrates an example computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

In one example of the methodology described herein, virtual extensible local area network ("VXLAN") is utilized as the infrastructure layer's encapsulation protocol. However, the use of VXLAN is exemplary only, and the methodology can be implemented using any encapsulation technology such as, for example, Transparent Interconnection of Lots of Links (TRILL). In VXLAN, the user's data traffic is injected into the VXLAN network from an ingress switch which encapsulates the user's data traffic within a VXLAN packet with the UDP source port set to a value based on the inner packet's header information. This dynamic setting of the UDP source port in a VXLAN header allows the packet to follow alternate Equal Cost Multi-Paths (ECMPs) within the VXLAN infra-network. At the egress switch (the boundary of the VXLAN network), the packet is de-capsulated and the inner packet (the user data packet) is forwarded out.

Figure 3:
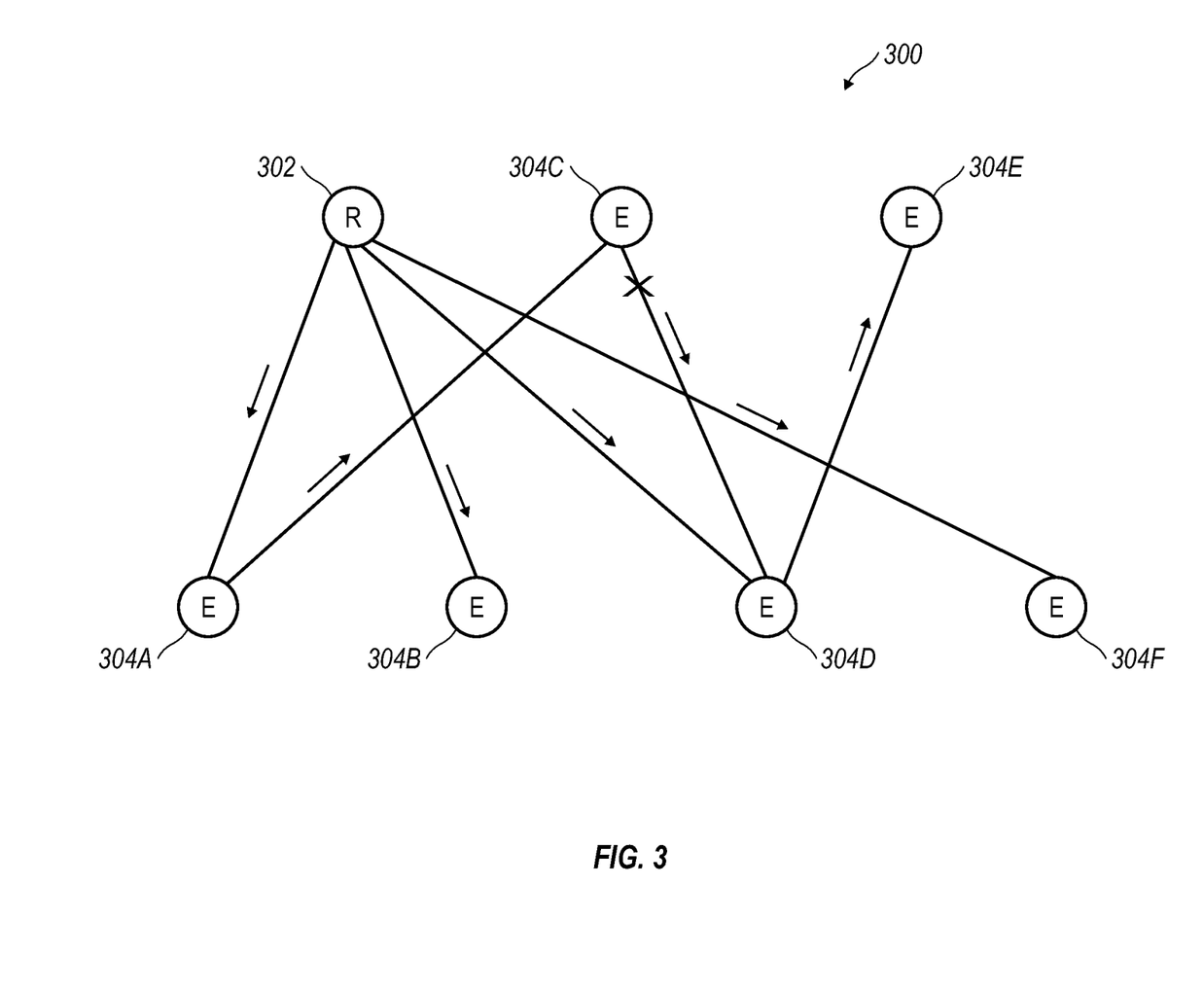
FIG. 3 illustrates an example network topology incorporating the methodology of the present disclosure.

In one example of the present disclosure, an automatic loop detection methodology is employed. This methodology can be implemented by the CPU 162 of network device 110 shown in FIG. 2, which can be part of, for example, a root node in a multicast tree or in some separate entity. FIG. 3 illustrates a network 300 having a root node 302 and multiple edge switches (also referred to as "nodes" or "ToRs") 304A-304E (collectively "304"), forming one or more multicast trees. In one example, the root node 302 can view network 300 based on an intermediate system to intermediate system ("IS-IS") link state database ("LSDB") routing protocol. From this, root node 302 can calculate the maximum distance (hops) the most distant ToR 304 of a given FTAG tree is from root node 302. This can be identified as the FTAG tree radius.

An infra-space multicast group address (GIPo) is reserved for each FTAG instance. After detecting a transient condition in the network, root node 302 can initiate a loop detection algorithm. In the loop detection algorithm, root node 302 sends a crafted data packet having an outer multicast address reserved as a GIPo address and a time-to-live ("TTL") value set to a value twice the value of the FTAG tree radius, to each node 304 of the FTAG tree. The VXLAN encapsulated packet with a destination address set to GIPo is forwarded across the chosen FTAG tree. The first root forwards the packet to the immediate ToRs, which are part of the FTAG. In turn, each subsequent switch which receives this packet forwards it to all the branches of the tree except for the link on which the packet was received. If there are no loops in the FTAG tree, this packet will follow the branches of the tree and will end up in the edge ToRs, where the inner packet is dropped and not forwarded out to the tenant servers. As this is a packet with a reserved GIPo, there are no corresponding GIPi (tenant multicast group addresses) that this packet maps to. However, if there is a loop, the packet is replicated at the point where the loop starts. Thus, a copy of the packet will eventually be sent back towards root node 302 of the FTAG tree. Upon receiving this duplicate packet, root node 302 can determine that the FTAG tree must have at least one cycle, i.e., that a loop exists. The node 304 which observes the packet's outer TTL drop to 0 reports this back to root node 302.

Thus, when root node 302 receives a message that an edge node 304 in the multicast tree detected the packet's TTL=0, root node 302 recognizes that a loop exists in the tree because, otherwise, edge node 304 should not observe the outer TTL value drop to 0. Thus, root node 302 can determine the presence of a loop by receiving a copy of the packet it forwarded out to the nodes 304 of the multicast tree, and it can also determine the presence and location of a loop if one of the nodes 304 reports back to root node 302 that the node 304 observed the outer packet's TTL to be 0.

The TTL of the packet's outer address is set to twice that of the FTAG tree radius to ensure that any looped packet reaches root node 302 before being discarded by one of the edge nodes 304 for TTL reasons. For example, referring to FIG. 3, if edge node 304E detects a loop, a copy of the packet is sent back to root node 302. If the copy is sent from node 304E to root node 302 via the path 304E-304D-304C-304B-302, it will require four hops, where the TTL of the packet decreases by 1 at each hop. Since the packet required the same four hops to go from root node 302 to node 304E (thus, the FTAG tree radius=4), it will require a total of 8 hops for a copy of the packet to return to root node 302, where 8 is double the FTAG tree radius. This ensures that the copy of the packet will not be dropped by a node 304 when that node detects the TTL as being 0. Further, by confining the TTL of the packet to twice the radius of the FTAG tree, some control can be exhibited over how long the packet will loop until it is discarded.

In one example of the present disclosure, multiple loops can be detected on different multicast trees. For example, root node 302 can initiate multiple loop detection algorithms by injecting a packet into each tree path. In one example, this can occur simultaneously. To maintain distinction between loop detection on multiple FTAG instances, root node 302 can keep each packet signature distinct from each other.

Loop detection logic can be used for advertising whether an FTAG tree is usable or not. For example, upon observing a transient condition by running the loop detection procedure described above, root node 302 can send a special Link State Packet (LSP) with a Link State Advertisement (LSA)

indicating a particular FTAG is not useful until a certain threshold amount of time has been reached to ensure that there is no loop and then advertise the FTAG is usable in the new LSA. It should be noted that instead of using a special link packet, any other form of notification to indicate usability of an FTAG can also be exploited in a given deployment. In this fashion, root node 302 of an FTAG tree can automate FTAG loop detection and loop avoidance logic.

In one example, after a loop or multiple loops in a multicast tree has been detected, as described above, an automatic loop repair implementation can be employed. This methodology can be implemented, for example, by the CPU 162 of network device 110 shown in FIG. 2, which could be, for example, part of root node 302, or could be in some separate entity. As an example, an FTAG tree may have potential loops inside. Although the FTAG tree may contain multiple loops, the implementation disclosed herein addresses a single loop instance. The implementation may be applied to an FTAG tree having multiple loops.

When a special/reserved GIPo packet is discarded by an FTAG tree node because the packet's TTL=0, this is an indication that there exists a loop in the FTAG tree with the node 304 that detects the packet's TTL=0 being part of the loop. Because root node 302 has set the packet's initial TTL as twice the FTAG tree radius, an edge node 304 should not observe an outer TTL=0 outer packet unless there is loop. The node 304 that detects the value of the packet's TTL=0 can look at its local ports and/or links which are part of the FTAG tree. Node 304 then proceeds to cut off the designated ports. In one example, this is the port through which its downstream neighbor thinks has the shortest path to root node 302. For example, referring to FIG. 3, node 304E sends a message back to root node 302 that it has detected the TTL value of the packet received from root node 302 to be 0. Node 304E then cuts off its link with node 304D, which will break the loop without breaking reachability. Once the downstream node 304D has updated its view of the network, it re-converges with what should be its root port and thus will restore the FTAG tree in its intended final form. Note that the loop detection and repair can proceed repeatedly until all loops are detected and repaired.

Figure 4:
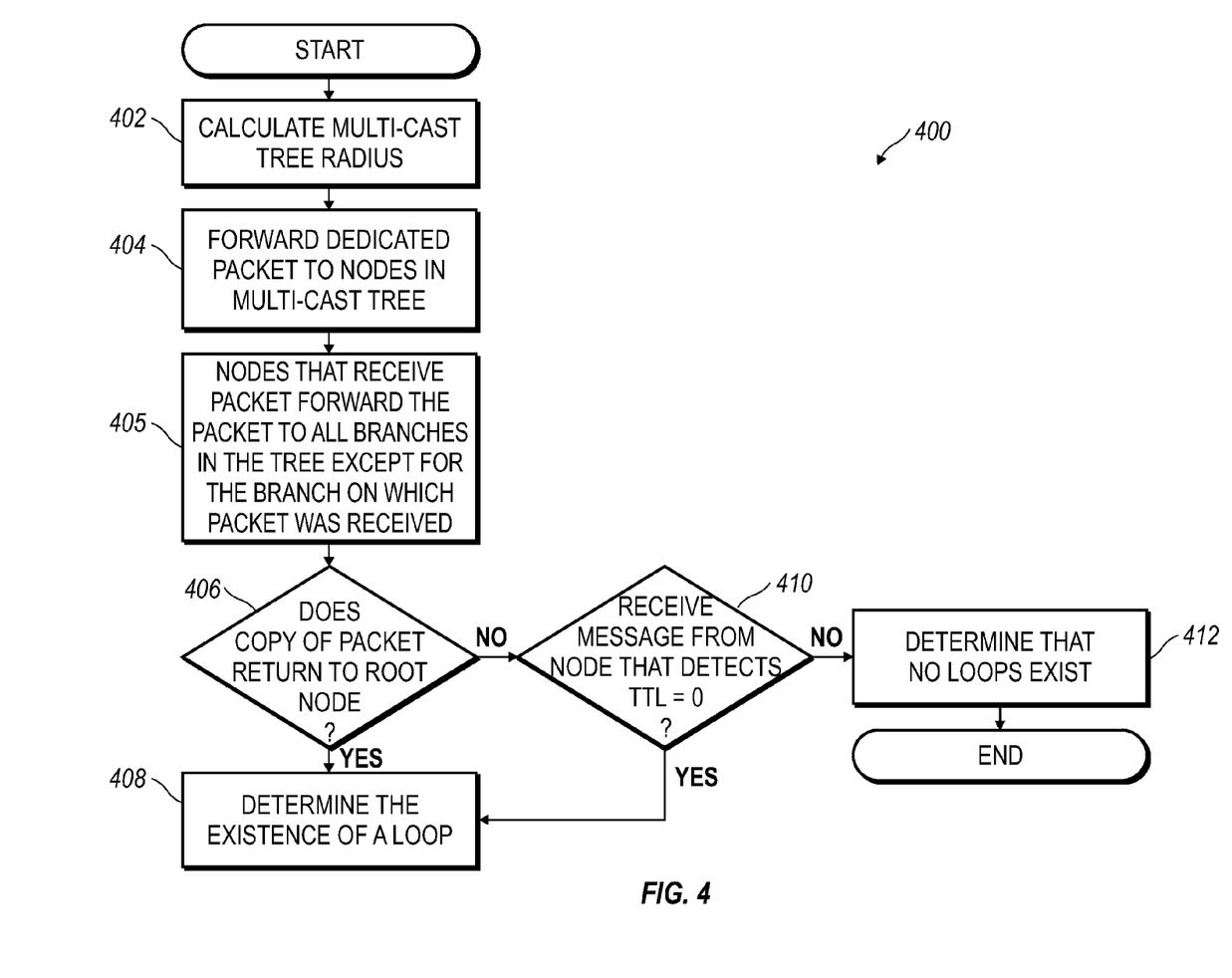
FIG. 4 illustrates an example method utilizing embodiments of the present disclosure.

FIG. 4 illustrates a method 400 performed by an example embodiment of the present disclosure. In step 402, a multicast tree radius is calculated. As described above, the multi-cast tree radius is defined as the maximum distance, or hops, the most distant node 304 of a given FTAG tree is from root node 302. In step 404, a specially formed packet, specifically formed to detect loops in the multi-cast tree, is forwarded to each node in the multi-cast tree. This packet includes a TTL set to double the value of the multi-cast tree radius. This ensures that, should a loop in the multicast tree exist, a copy of the packet is returned to root node 302. At step 405, each node that receives a packet can then forward the packet to other nodes in the branches in the multicast tree with the exception of the branch on which the node received the packet.

At step 406, it is determined if a copy of the packet has been returned by an edge node 304 to root node 302. If root node 302 does receive a copy of the packet, it is confirmed that a loop exists somewhere in the tree, at step 408. At step 410, it is determined if root node 302 receives a message from one of the edge nodes 304 in the multicast tree, the message indicating that a particular edge node 304 detected the packet's TTL=0. If this message is received, root node 302 recognizes that a loop exists and also knows the location of the loop. The location of the loop is determined by the location of the node 304 that detected the TTL of the forwarded packet having a value of 0. If a copy of the packet is not returned to root node 302 and no edge node 304 sends a message that it recognized the packet's TTL value=0, then root node 302 recognizes that there is no loop in the multicast tree.

Figure 5A:
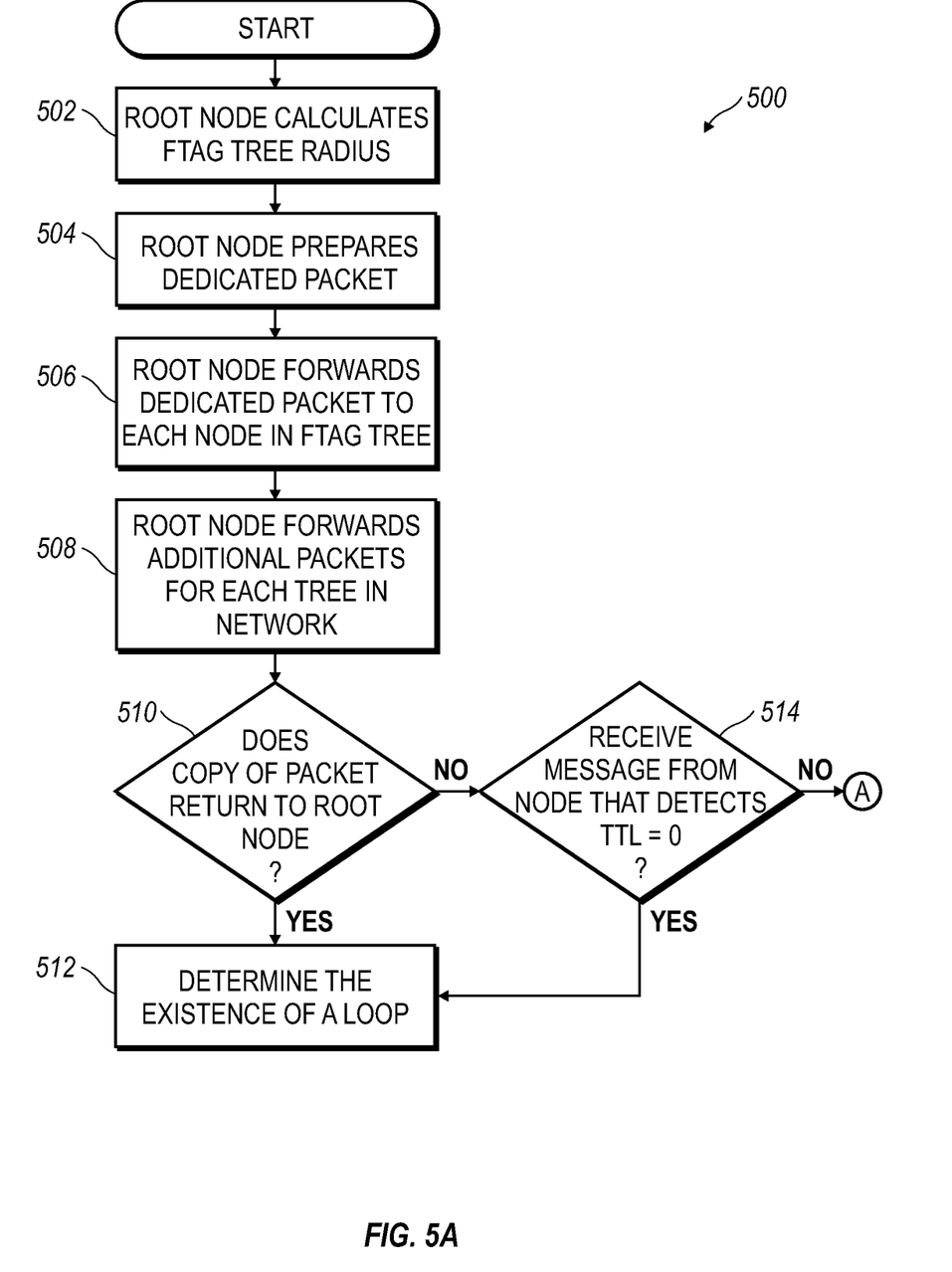
FIGS. 5A and 5B illustrate a more detailed method utilizing embodiments of the present disclosure.
Figure 5B:
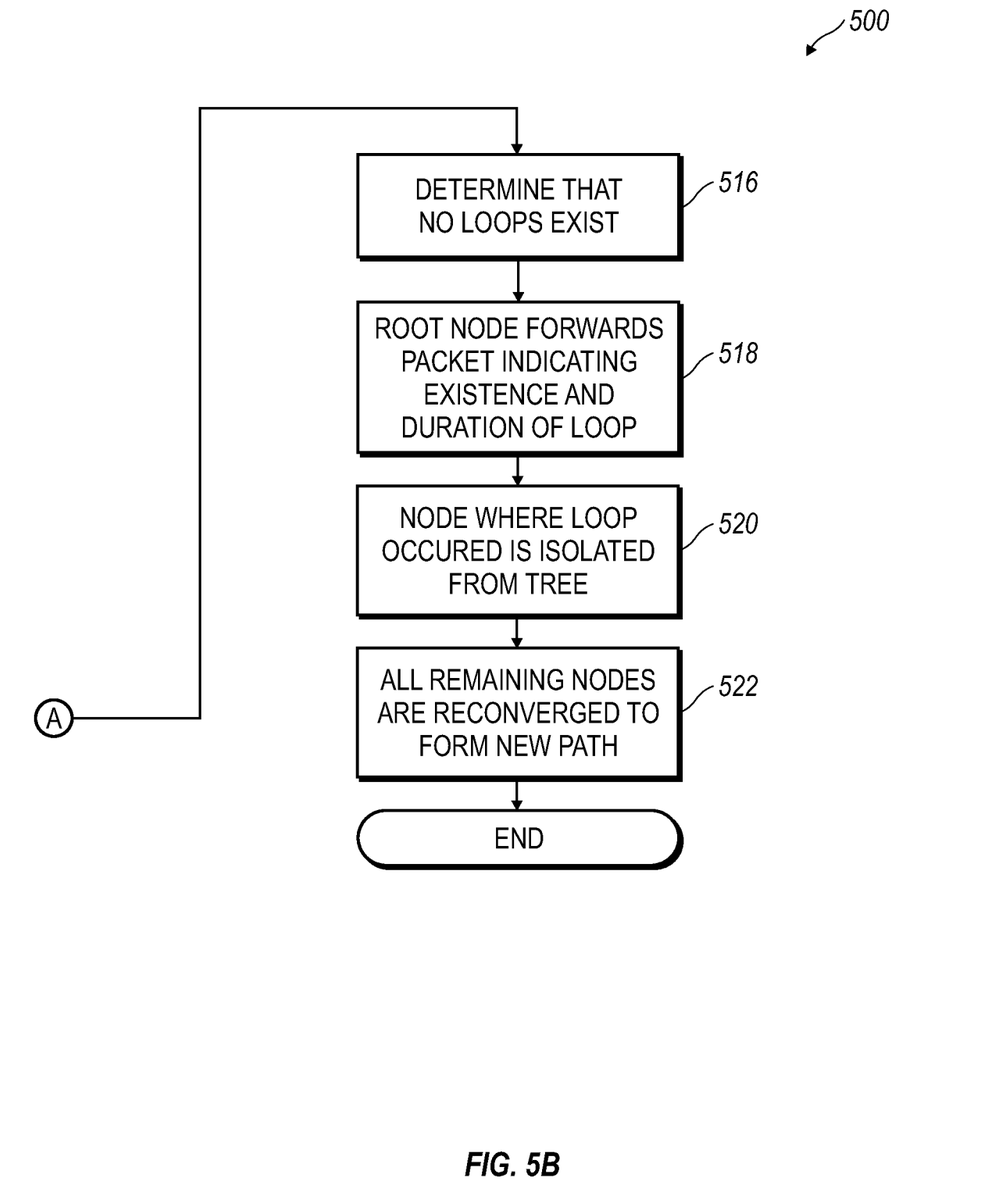

FIGS. 5A and 5B illustrate a more detailed method 500 performed by an example embodiment of the present disclosure. It should be understood that, for any process discussed herein, such as those depicted in FIG. 4 and FIGS. 5A and 5B, there can be additional, fewer, or alternative steps, performed in similar or different orders, or in parallel, within the scope of the various embodiments unless otherwise stated. At step 502, root node 302 calculates the tree radius of the multicast tree. At step 504, root node 302 prepares a dedicated packet having its own GiPo address. This packet includes a TTL value equal to twice the multicast tree radius. At step 506, root node 302 forwards the packet to each node in the multicast tree. The subsequent nodes then forward the packet along the FTAG tree branches, other than the branch or link on which they received the packets. In order to determine if other loops exist in different trees in the network, root node 302 can, at step 508, prepare additional dedicated packets, each having their own GiPo address, and forward these packets along each tree. Thus loop detection along different paths in the network can occur simultaneously or virtually simultaneously.

At step 510, root node 302 determines if it receives a copy of the packet that it sent out. This could be multiple packets if root node 302 sent out multiple packets for multiple loop detection algorithms. If a copy of the packet that root node 302 forwarded out is received back, then root node 302 recognizes that a loop exists in the multicast tree, at step 512. At step 514, if root node 302 receives a message from a node 304 that the node detected the packet's TTL=0, then root node 302 recognizes that a loop exists in the multicast tree, and, specifically, that the node 304 that sent the message, is part of the loop. Referring to FIG. 5B, at step 516, if root node 302 does not receive a copy of the packet it forwarded to edge nodes 304 and does not receive a message from one of the nodes 304 that the node recognized a packet TTL value=0, then root node 302 determines that no loop exists in the multicast tree.

In one example, if root node 302 has determined that a loop exists, it sends out an LSP packet with a link state advertisement ("LSA") that informs the other nodes in the network that a loop exists on the detected FTAG, at step 518. For example, upon seeing a transient condition, root node 302 can send a special LSP packet with an LSA indicating a particular FTAG is not useful until a certain threshold of time has elapsed. Once the loop is repaired, root node 302 can advertise that the FTAG is again usable in a new LSA.

If root node 302 receives a message from one of the nodes 304 in the network, indicating that the node has received a packet having a TTL value=0, that node 304 can, at step 520, then isolate any links or ports which are part of the FTAG tree and cut off the designated ports from the FTAG tree. This will essentially break the loop without impairing reachability. Once the downstream node 304 has an updated view of the network, it reconverges with what should be its root port 302, at step 522, restoring the FTAG tree to its intended final form.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

I claim:

1. A method comprising:
    calculating a multicast tree radius for a first multicast tree, the multicast tree radius representing a maximum number of hops from a root node to a furthest edge node in the first multicast tree;
    forwarding, by the root node, a first packet to each edge node within the first multicast tree, the first packet having a time-to-live (TTL) value equal to twice the first multicast tree radius;
    receiving, at the root node, a copy of the forwarded first packet;
    determining an existence of a loop in the first multicast tree based at least upon receiving the copy of the forwarded first packet;
    forwarding, by the root node, a second packet to each edge node within a second multicast tree, the second packet having a TTL value equal to twice a second multicast tree radius, the second packet having a signature different from the first packet; and
    determining an existence of a loop in the second multicast tree by receiving, at the root node, a copy of the forwarded second packet, wherein determining the existence of a loop in the first multicast tree occurs simultaneously with determining the existence of the loop within the second multicast tree.

2. The method of claim 1, wherein determining the existence of a loop in the first multicast tree further comprises receiving a notification from a particular edge node in the first multicast tree, the notification indicating that the particular edge node detected the TTL value of the first packet equal to zero.

3. The method of claim 1, further comprising forwarding, by the root node, a label switched path (LSP) packet indicating the existence of at least one loop within the first multicast tree.

4. The method of claim 2, wherein the particular edge node is isolated from the first multicast tree upon detection of the loop within the first multicast tree.

5. The method of claim 4, wherein upon detection of the loop within the first multicast tree, further comprising reconverging all remaining edge nodes with the root node after the particular edge node is isolated from the first multicast tree.

6. A system comprising:
    at least one edge node; and
    a root node in communication with the at least one edge node, the root node and the at least one edge node forming a first multicast tree, the root node configured to:
        calculate a multicast tree radius for the first multicast tree, the multicast tree radius representing a maximum number of hops from the root node to a furthest edge node in the first multicast tree;
        forward a first packet to each edge node within the first multicast tree, the first packet having a time-to-live (TTL) value equal to twice the multicast tree radius for the first multicast tree;
        receive a copy of the forwarded first packet;
        determine an existence of a loop in the first multicast tree based at least upon receiving the copy of the forwarded first packet;
        forward a second packet to each edge node within a second multicast tree, the second packet having a TTL value equal to twice the second multicast tree radius, the second packet having a signature different from the first packet; and
        determine an existence of a loop in the second multicast tree by receiving a copy of the forwarded second packet, wherein determining the existence of a loop in the first multicast tree occurs simultaneously with determining the existence of the loop within the second multicast tree.

7. The system of claim 6, wherein the root node further determines the existence of a loop in the first multicast tree by being configured to receive a notification from a particular edge node in the first multicast tree, the notification indicating that the particular edge node detected the TTL value of the first packet equal to zero.

8. The system of claim 6, wherein the root node is further configured to forward a label switched path (LSP) packet indicating the existence of at least one loop within the first multicast tree.

9. The system of claim 7, wherein the particular edge node is isolated from the first multicast tree upon detection of the loop within the first multicast tree.

10. The system of claim 9, wherein the root node is further configured to reconverge all remaining edge nodes with the root node after the particular edge node is isolated from the first multicast tree.

11. The system of claim 6, wherein each edge node that receives the first packet, forwards the first packet to at least one other node in the multicast tree.

12. A non-transitory computer-readable storage medium having stored therein instructions which, when executed by a processor, cause the processor to perform operations comprising:

calculating a multicast tree radius for a first multicast tree, the multicast tree radius representing a maximum number of hops from a root node to a furthest edge node in the first multicast tree;

forwarding a first packet to each edge node within the first multicast tree, the first packet having a time-to-live (TTL) value equal to twice the first multicast tree radius;

receiving a copy of the forwarded first packet;

determining an existence of a loop in the first multicast tree based at least upon receiving the copy of the forwarded first packet;

forwarding a second packet to each edge node within a second multicast tree, the second packet having a TTL value equal to twice the second multicast tree radius, the second packet having a signature different from the first packet; and determining an existence of a loop in the second multicast tree by receiving a copy of the forwarded second packet, wherein determining the existence of a loop in the first multicast tree occurs simultaneously with determining the existence of the loop within the second multicast tree.

13. The non-transitory computer-readable storage medium of claim 12, storing additional instructions which, when executed by the processor, result in operations further comprising determining the existence of a loop in the first multicast tree by receiving a notification from a particular edge node in the first multicast tree, the notification indicating that the particular edge node detected the TTL value of the first packet being equal to zero.

14. The non-transitory computer-readable storage medium of claim 13, storing additional instructions which, when executed by the processor, result in operations further comprising, upon detection of the loop within the first multicast tree, reconverging all remaining edge nodes with the root node after the particular edge node is isolated from the first multicast tree.

* * * * *